United States Patent
Zeng et al.

(10) Patent No.: US 11,869,546 B1
(45) Date of Patent: Jan. 9, 2024

(54) ADAPTIVE DUAL HEATER MODE FOR HARD DISK DRIVE

(71) Applicant: Western Digital Technologies, Inc., San Jose, CA (US)

(72) Inventors: Qinghua Zeng, Fremont, CA (US); Noureddine Kermiche, Dana Point, CA (US); Kazuhiro Saito, Salt Lake City, UT (US); Bernhard E. Knigge, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/874,903

(22) Filed: Jul. 27, 2022

(51) Int. Cl.
*G11B 5/54* (2006.01)
*G11B 5/012* (2006.01)
*G11B 13/08* (2006.01)
*G11B 5/00* (2006.01)

(52) U.S. Cl.
CPC .............. *G11B 5/012* (2013.01); *G11B 13/08* (2013.01); *G11B 2005/0021* (2013.01)

(58) Field of Classification Search
CPC .................. G11B 5/4826; G11B 5/012; G11B 2005/0021; G11B 27/36; G11B 5/58; G11B 5/54; G11B 5/5536; G11B 20/20
USPC .............................................. 360/59, 75, 76
See application file for complete search history.

(56) References Cited

U.S. PATENT DOCUMENTS

| | | |
|---|---|---|
| 7,190,543 B2 | 3/2007 | Suk |
| 8,634,167 B2 | 1/2014 | Hsiao et al. |
| 8,730,608 B1 | 5/2014 | Van Eaton et al. |
| 8,810,952 B2 * | 8/2014 | Johnson ................. G11B 27/36 360/75 |
| 8,929,016 B2 | 1/2015 | Gao et al. |
| 9,058,829 B1 | 6/2015 | Wolf et al. |
| 9,153,272 B1 | 10/2015 | Rausch et al. |
| 9,478,248 B2 | 10/2016 | Cordle et al. |
| 9,564,163 B2 | 2/2017 | Contreras et al. |
| 9,626,989 B1 | 4/2017 | Buch et al. |
| 9,704,519 B1 | 7/2017 | Zhu et al. |
| 9,842,618 B1 | 12/2017 | Hutchinson et al. |
| 10,395,678 B1 | 8/2019 | Rajauria et al. |
| 10,679,653 B1 | 6/2020 | Zeng et al. |
| 2013/0094104 A1 | 4/2013 | Ngan et al. |

OTHER PUBLICATIONS

Boettcher et al., "Dynamic Flying Height Adjustment in Hard Disk Drives Through Feedforward Control", IEEE Transactions on Magnetics, 47(7): 1823-1829, Jul. 2011.
Zheng et al., "The Effect of Write Current on Thermal Flying Height Control Sliders with Dual Heater/Insulator Elements", Microsystem Technologies, 17(5): 6 pages, Jan. 19, 2011.

* cited by examiner

*Primary Examiner* — Nabil Z Hindi
(74) *Attorney, Agent, or Firm* — Neugeboren O'Dowd PC

(57) ABSTRACT

Various illustrative aspects are directed to a data storage device comprising a disk; a read/write head having read and write portions configured to read data from and write data to the disk; read and write heaters configured to thermally adjust read and write spacings of the read and write portions from the disk surface; and a controller configured to control power applied to the read and write heaters based on a dual heater power ratio (DHR) of the respective power applied to each heater. The DHR is set based on a point during touchdown at which a reader shield and a writer shield have maximum contact with the surface of the disk (DHRmax).

19 Claims, 12 Drawing Sheets

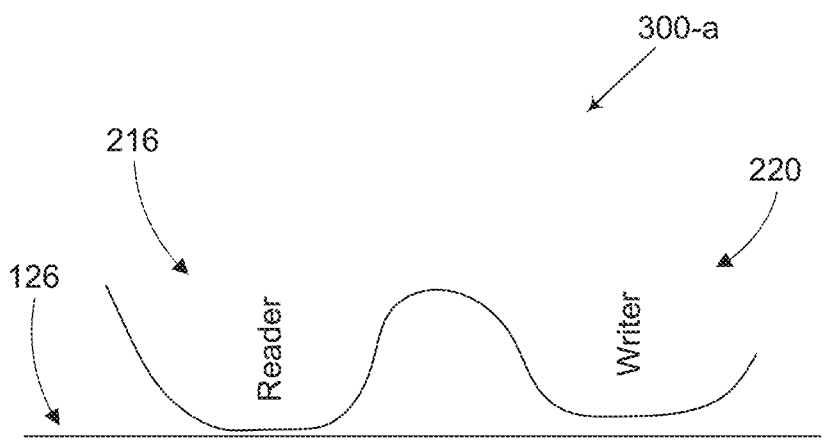
FIG. 3A (5 deg C)
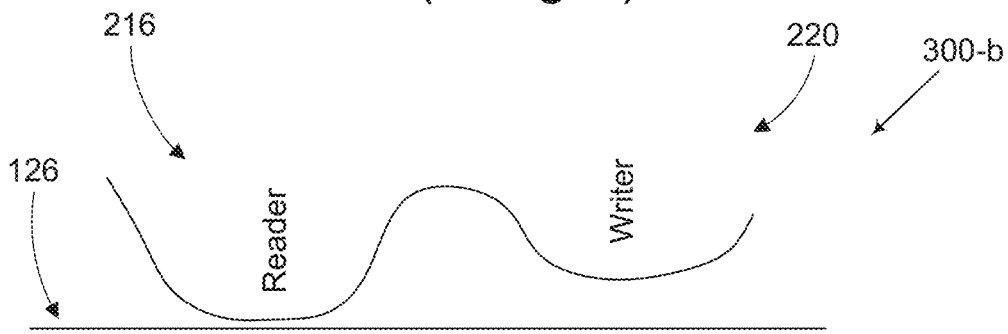
FIG. 3B (25 deg C)
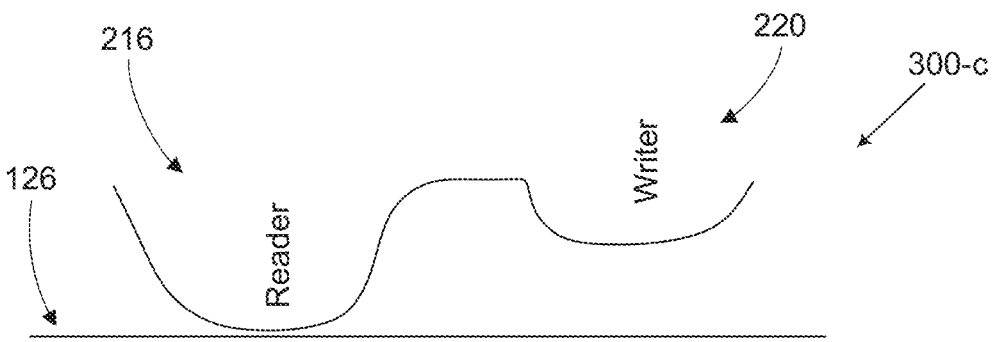
FIG. 3C (70 deg C)

A: DHR=100% or TFC1 only

B: DHR=0%, or TFC2 only

C: DHR=10~30% as example

D: DHR=60%~90% as example

ADAPTIVE DUAL HEATER MODE FOR HARD DISK DRIVE

BACKGROUND

Data storage devices such as hard disk drives (HDDs) comprise at least one disk, and at least one magnetic read/write head connected to a distal end of a suspension arm that is pivoted by an actuator such as a voice coil motor (VCMs) to position the read/write head radially over the disk surface at a carefully controlled fly height. The disk surface comprises a plurality of radially spaced, concentric servo tracks for recording user data sectors, and a plurality of servo sectors or wedges. The servo sectors comprise head positioning information that is read by the head and processed by a servo control system to control the actuator arm as it moves from track to track.

The disk is typically rotated by a spindle motor at high speed such that an air bearing forms between the read/write head and the disk surface. The read/write head is formed integrally on a slider that has an air bearing surface (ABS). When the slider flies on the air bearing, the read/write head writes magnetic impressions to and reads magnetic impressions from the rotating disk. The fly height of the read/write head, which is the spacing between the read/write head and the disk surface, is of great importance to the performance of the HDD. The performance of the read/write head increases as the spacing between the read/write head and the disk surface decreases. However, the head should not actually contact the disk as this can result in damage to the head and/or the disk.

A thermal heater may be incorporated into the read/write head to thermally expand a portion of the read/write head and thereby decrease the spacing between the read/write head and the disk surface. Dual heaters, with a read heater near a read portion of the head and a write heater near the write portion of the head, enable separate adjustments in spacing of the read and write portions of the head from the disk surface. Various other factors also affect the spacing of the read and write portions of the head from the disk surface, which in turn affects the power that should be applied to the read and write heaters.

SUMMARY

Various aspects of this disclosure provide an adaptive dual heater (ADH) mode for a hard disk drive (HDD).

One aspect of this disclosure is directed to a data storage device comprising a disk; a read/write head having a read portion configured to read data from the disk and a write portion configured to write data to the disk; a read heater disposed proximate to the read portion and configured to thermally adjust a read spacing of the read portion from a surface of the disk; a write heater disposed proximate to the write portion and configured to thermally adjust a write spacing of the write portion from the surface of the disk; and a controller configured to control power applied to the read heater and power applied to the write heater based on a dual heater power ratio (DHR) of the respective power applied to each heater, wherein the DHR is set based on a point during touchdown at which a reader shield and a writer shield have maximum contact with the surface of the disk (DHRmax).

Another aspect of this disclosure is directed to a data storage device comprising a disk; one or more read/write heads configured to read data from the disk and to write data to the disk; a plurality of heaters disposed in each of the one or more read/write heads and configured to thermally adjust a spacing of the corresponding read/write head from a surface of the disk; and a controller configured to control an amount of power applied to the plurality of heaters based on a point during touchdown at which a reader shield and a writer shield of the corresponding read/write head have maximum contact with the surface of the disk (DHRmax).

A further aspect of this disclosure is directed to a method for determining a dual heater power ratio (DHR) for controlling power applied to a read heater and a write heater of a read/write head of a data storage device, the method comprising setting the DHR based in part on a point during touchdown at which a reader shield and a writer shield have maximum contact with the surface of the disk (DHRmax) and based in part on a head additional adjustment (HAA).

Another aspect of this disclosure is directed to one or more processing devices comprising means for determining DHRmax to be a DHR value during touchdown at which a reader shield and a writer shield of the read/write head have maximum contact with a surface of a disk of the data storage device, where DHRmax is determined on a per-head basis; means for setting the dual heater power ratio (DHR) based at least in part on DHRmax and a head additional adjustment (HAA); and means for adjusting the DHR during operation of the data storage device based on an operating temperature of the read/write head.

In some implementations of the data storage device, the method, and/or the one or more processing devices described herein, the controller is further configured to determine DHRmax on a per-head basis, and the DHR for each read/write head of the data storage device, including at least the read/write head, is based at least in part on a corresponding DHRmax and a head additional adjustment (HAA).

In some implementations of the data storage device, the method, and/or the one or more processing devices described herein, the DHR for each read/write head is DHR=DHRmax+HAA.

In some implementations of the data storage device, the method, and/or the one or more processing devices described herein, the controller is configured to use the same HAA for all heads in a full temperature range. The HAA is determined based on wafer design, a pole tip recession (PTR) mean value, a near-field transducer protrusion mean value, and a reliability required margin.

In some implementations of the data storage device, the method, and/or the one or more processing devices described herein, the HAA is between 10~30%. In other cases, the HAA may be 3~45%. Other percentage ranges are contemplated in different embodiments and the examples listed herein are not intended to be limiting. However, the HAA will be less than or equal to 100%-DHRmax.

In some implementations of the data storage device, the method, and/or the one or more processing devices described herein, the controller is configured to determine a temperature adaptive adjustment on a per-head basis that is used to adjust the DHR based on a temperature of a respective read/write head during operation of the data storage device.

In some implementations of the data storage device, the method, and/or the one or more processing devices described herein, a range of temperature adaptive adjustments are determined on a per-head basis during manufacture of the data storage device.

In some implementations of the data storage device, the method, and/or the one or more processing devices described herein, a range of temperature adaptive adjustments are determined for a group of read/write heads, including at least the read/write head, before manufacture of the data storage device.

In some implementations of the data storage device, the method, and/or the one or more processing devices described herein, DHRmax is determined during a manufacturing stage or manufacturing process of the data storage device.

Additional aspects of this disclosure are depicted and described in the accompanying drawings and the following description.

BRIEF DESCRIPTION OF THE DRAWINGS

Various features and advantages of this disclosure will be apparent from the following description and accompanying drawings. The drawings are not necessarily to scale; emphasis instead is placed on illustrating the principles of this disclosure. In the drawings, like reference characters may refer to the same parts throughout the different figures. The drawings depict illustrative examples of this disclosure and are not limiting in scope.

FIG. 3A is a conceptual diagram illustrating the isothermal protrusion effect on the spacing of the read and write portions of the read/write head from the disk surface at 5 degrees C., according to various aspects of this disclosure.

FIG. 3B is a conceptual diagram illustrating the isothermal protrusion effect on the spacing of the read and write portions of the read/write head from the disk surface at 25 degrees C., according to various aspects of this disclosure.

FIG. 3C is a conceptual diagram illustrating the isothermal protrusion effect on the spacing of the read and write portions of the read/write head from the disk surface at 70 degrees C., according to various aspects of this disclosure.

DETAILED DESCRIPTION

Figure 1B:
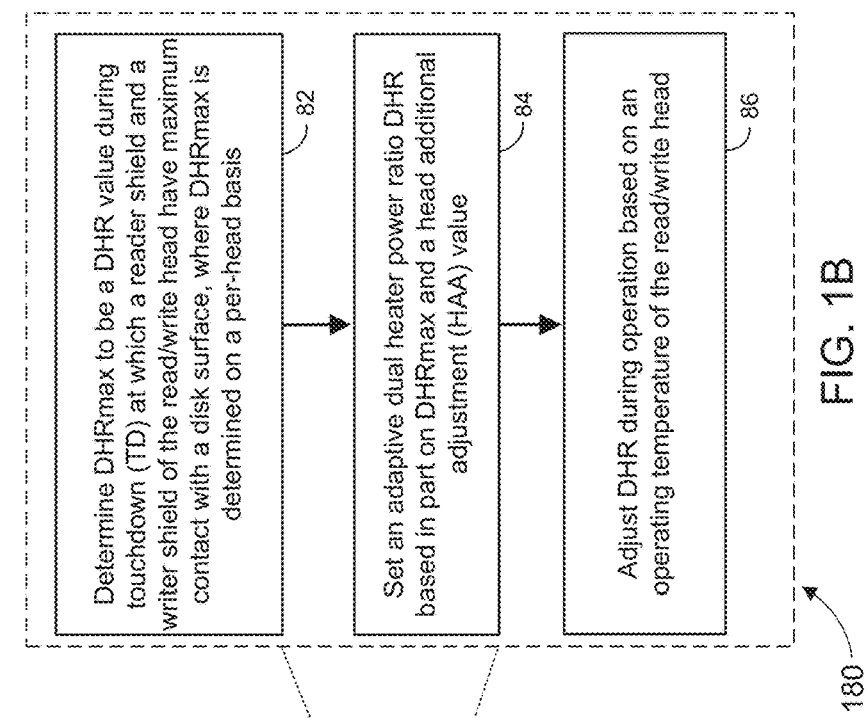
FIG. 1B illustrates a method that a data storage device may perform, execute, and implement, in accordance with aspects of the present disclosure.
Figure 1A:
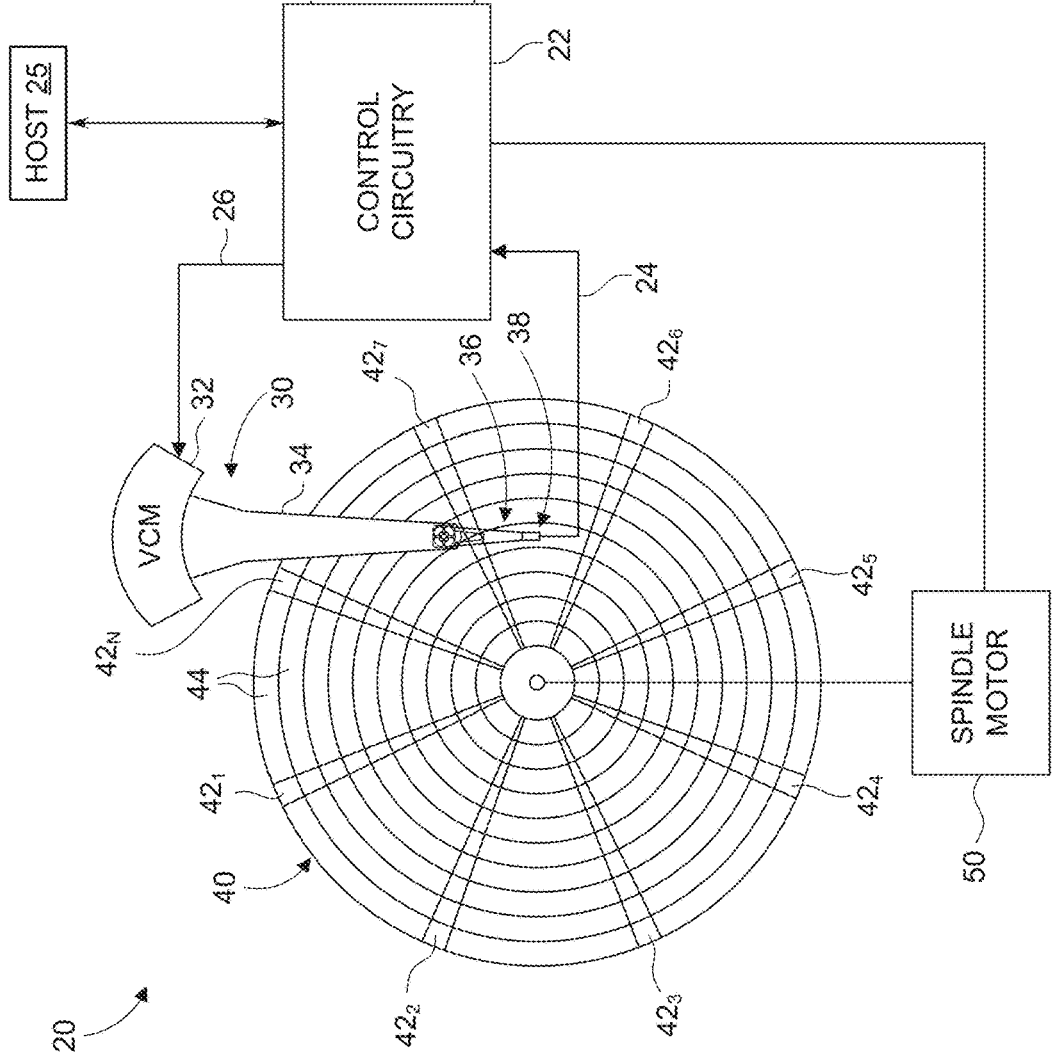
FIG. 1A is a conceptual diagram of a data storage device in the form of a hard disk drive (HDD), according to various aspects of this disclosure.

FIG. 1A is a conceptual diagram of a data storage device in the form of a hard disk drive (HDD) 20, according to various aspects of this disclosure. HDD 20 has an actuator assembly 30 configured to write data to and read data from disk 40 of disk drive 20 in response to control signals 26 from control circuitry 22. Actuator assembly 30 comprises an actuator such as voice control motor (VCM) 32, and a read/write head 38 integrated in a slider and suspended by suspension 36 over disk 40 at a distal end of actuator arm 34. Actuator arm 34 and suspension 36 are configured to suspend read/write head 38 at a fly height (FH) over the surface of disk 40.

HDD 20 further comprises a spindle motor 50 that rotates a spindle on which disk 40 is rotatably mounted. Spindle motor 50 comprises a plurality of windings and a rotor that is rotatable at a variable spin rate. Disk 40 is rotated by spindle motor 50 at high speed such that an air bearing forms between read/write head 38 and the surface of disk 40. The configuration of HDD 20 shown in FIG. 1A is for non-limiting purposes of illustration only. HDD 20 may comprise other numbers of actuators, actuator arms, suspensions, heads, disks, and other components than those shown in FIG. 1A. HDD 20 may also include additional components that are not shown in FIG. 1A.

Disk 40 comprises a plurality of servo sectors (e.g., $42_1$-$42_N$) that define a plurality of servo tracks 44. Data tracks are defined relative to servo tracks 44 at the same or different radial density. Control circuitry 22 processes a read signal 24 emanating from head 38 to demodulate the servo sectors and generate a position error signal (PES) representing an error between the actual position of head 38 and a target position relative to a target track 44. A servo control system in control circuitry 22 filters the PES using a suitable compensation filter to generate control signal 26 applied to actuator assembly 30, which in turn rotates actuator arm 34 about a pivot to move read/write head 38 radially over disk 40 in a direction that reduces the PES. The servo sectors comprise suitable head position information, such as a track address for coarse positioning and servo bursts for fine positioning. The servo bursts may comprise any suitable pattern, such as an amplitude-based servo pattern or a phase-based servo pattern.

In some examples, host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

In some examples, the control circuitry 22 is configured to perform the steps of method flow 180 shown in FIG. 1B, where the method flow 180 is directed to a method for determining an adaptive dual heater power ratio (DHR) applied to a read heater (Hr) or a write heater (Hw) of a read/write head (e.g., head 38 in FIG. 1A) of a data storage device (e.g., data storage device 20). Specifically, but without limitation, the control circuitry 22 is configured to determine DHRmax to be a DHR value during touchdown (TD) at which a reader shield and a writer shield of the read/write head have maximum contact with a surface of a disk of the data storage device (82). In some embodiments, DHRmax is determined on a per-head basis. As seen, the control circuitry 22 is further configured to set an adaptive dual heater power ratio (DHR) based at least in part on the DHRmax and a head additional adjustment (HAA) value (84), where, in one or more embodiments, the adaptive dual heater power ratio (DHR) is DHRmax+HAA. In some embodiments, DHR may be based on some other formulation involving DHRmax and HAA. In some embodiments, the control circuitry 22 is further configured to adjust the adaptive dual heater power ratio (DHR) during operation of the data storage device based on an operating temperature of the read/write head (86). In some embodiments, the DHRmax (e.g., determined on a per-head basis) is determined during a manufacturing stage/process of the data storage device. Furthermore, the head additional adjustment or HAA value can be determined, for example, during the manufacturing process of the data storage device, and is based on various factors including wafer design, a pole tip recession (PTR) value, a near-field transducer protrusion during writing (NFTptp) value, and a required reliability margin. While not shown, in some embodiments, the method (e.g., method flow 180) further comprises determining a range of temperature adaptive adjustments during a manufacturing process of the data storage device on a per-head basis. Alternatively, in some embodiments, the method (e.g., method flow 180) comprises determining a range of temperature adaptive adjustments for a group of read/write heads before a manufacturing process of the data storage device, where the group of read/write heads includes at least the read/write head.

Figure 2:
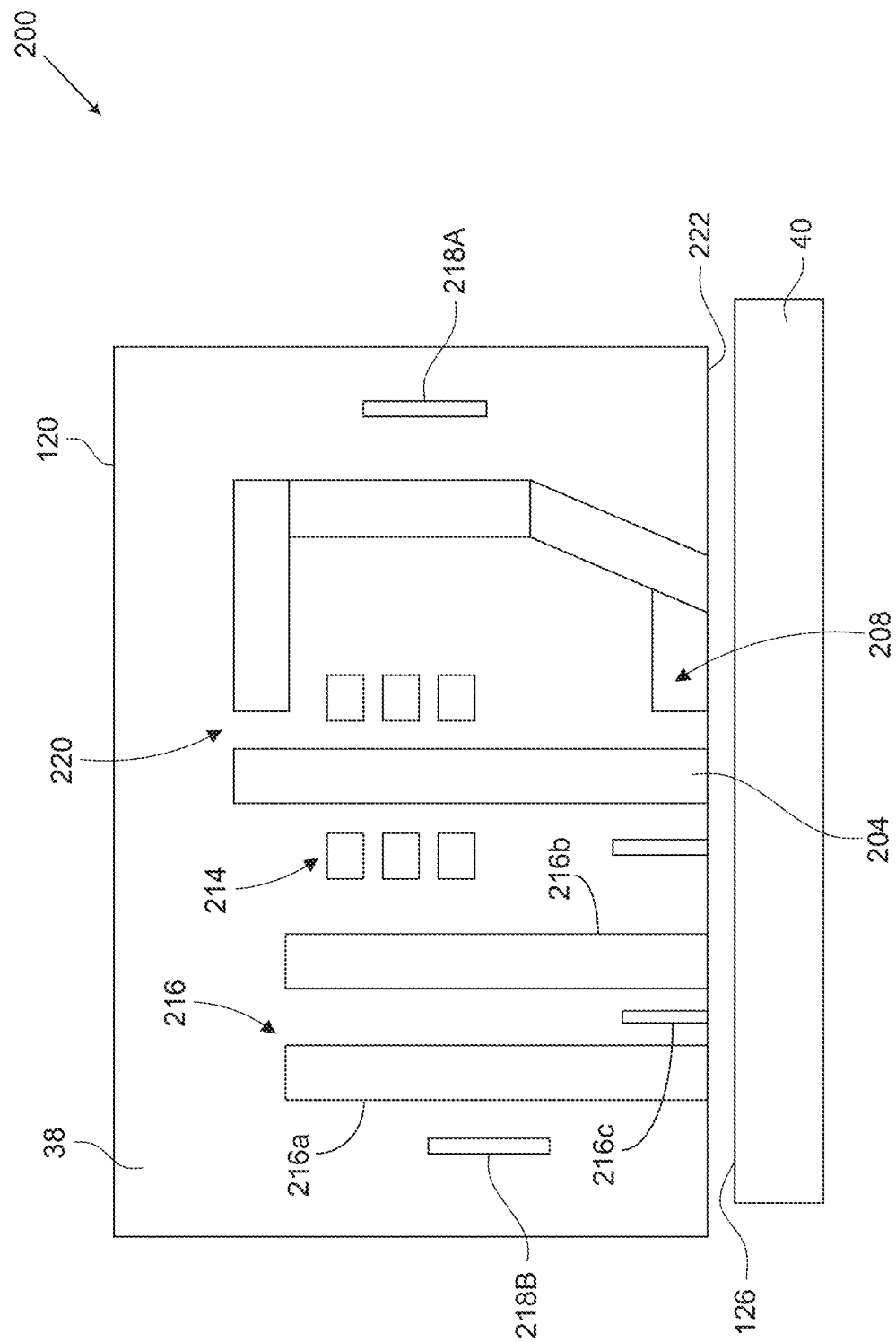
FIG. 2 is a conceptual diagram at a cross-sectional view of a read/write head, according to various aspects of this disclosure.

FIG. 2 is a conceptual diagram 200, at a cross-sectional view, of an exemplary implementation of read/write head 38, according to various aspects of the disclosure. Read/write head 38 is integrated with slider 120. In response to control signals from control circuitry 22, slider 120 flies at a fly height (FH) over disk surface 126 of disk 40, with air bearing surface (ABS) 222 of read/write head 38 disposed proximate to disk surface 126. Reducing the FH spacing, that is, the spacing between read/write head 38 and disk surface 126, helps to increase the capacity for reading and writing high density information. Read/write head 38 includes a write portion 220 comprising coil 214 positioned proximate main magnetic pole (MP) 204 and trailing shield 208, and a read portion 216. Read portion 216 comprises read shields 216a and 216b and read sensor element 216c positioned between shields 216a and 216b.

The spacing of read portion 216 and write portion 220 from disk surface 126 is subject to significant variation from head-to-head and at different temperatures. Head-to-head spacing variation is mainly due to variations in the thermal-mechanical properties of the wafer that comprises read/write head 38, variations in pole tip recession (PTR), and variations in the slider flying height (FH), to name a few non-limiting examples. Spacing variation at different temperatures is mainly due to isothermal protrusion differences at different temperatures which causes different spacing at different temperatures.

FIGS. 3A-3C are conceptual diagrams 300-a, 300-b, and 300-c, respectively, illustrating the isothermal protrusion effect on the spacing of read portion 216 and write portion 220 of read/write head 38 from disk surface 126 at different temperatures, according to various aspects of this disclosure. FIG. 3A illustrates the isothermal protrusion effect at 5 degrees C.; FIG. 3B illustrates the isothermal protrusion effect at 25 degrees C.; and FIG. 3C illustrates the isothermal protrusion effect at 70 degrees C. As can be seen in FIGS. 3A-3C, read portion (reader) 216 is generally unaffected by the temperature of the environment in which HDD 20 is utilized. Conversely, while write portion (writer) 220 is close to disk surface 126 at 5 degrees C. (FIG. 3A), it is spaced further from disk surface 126 at 25 degrees C. (FIG. 3B), and even further at 70 degrees C. (FIG. 3C). Due to this isothermal protrusion effect, the spacing of write portion 220 from disk surface 126 increases by about 2.2 nm from 5 degrees C. to 70 degrees C., which is a typical temperature range within which HDD 20 is generally used.

Figure 3D:
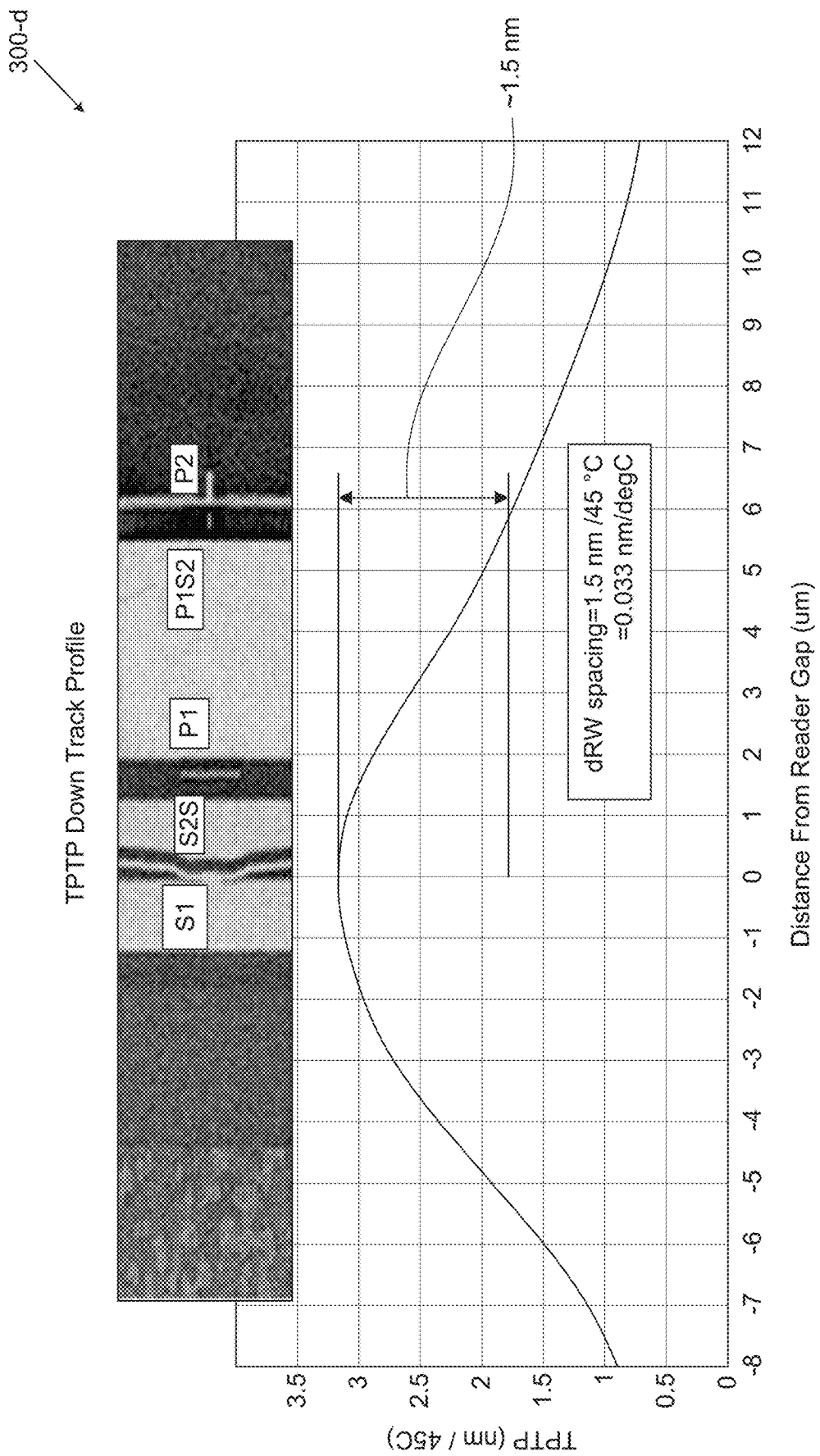
FIG. 3D is a graph illustrating the isothermal protrusion effect on the read/write head spacing from the disk surface, according to various aspects of this disclosure.

FIG. 3D is a graph 300-d illustrating the isothermal protrusion effect on the spacing of read/write head 38 from disk surface 126, according to various aspects of this disclosure. The horizontal or x-axis of FIG. 3D is the distance from the read gap (between read shields 216a and 216b, where read sensor element 216c in micrometers, and the vertical or y-axis is the change in head spacing (thermal pole tip protrusion (TPTP)) in nanometers per 45 degrees C. in temperature change. As can be seen in FIG. 3D, the average change in read/write head spacing dRW is 1.5 nm/45 degrees C., which is approximately 0.033 nm/degree C.

Figure 4:
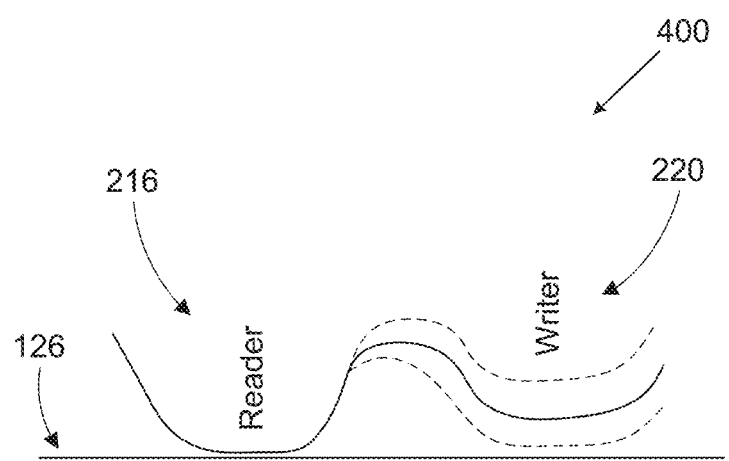
FIG. 4 is a conceptual diagram illustrating the pole tip recession (PTR) effect on spacing, according to various aspects of this disclosure.

FIG. 4 is a conceptual diagram 400 depicting the pole tip recession (PTR) effect on the spacing of read portion 216 and write portion 220 of read/write head 38 from disk surface 126, according to various aspects of this disclosure. PTR, which is the difference in height between the bottom surface of a pole tip (the tip of the transducer extending from the head stack) and the bottom surface of the slider body, can result in an increase in spacing between recording elements and magnetic media that is undesirable for magnetic recording. In one non-limiting example, the PTR effect on the spacing of write portion 220 from disk surface 126 is about 1.86 nm when the standard deviation is ~ 0.31 nm. In some examples, variations in the slider flying height (FH) also contribute to read/write head spacing variation (e.g., about 0.88 nm in a typical case). The combination of isothermal protrusion, PTR, and slider fly-height (FH) effects on the spacing of read portion 216 and write portion 220 of read/write head 38 from disk surface 126 has the result that writer head spacing variation is very large (2.2+2.1 nm).

To overcome these variable effects on read/write head spacing, a single thermal heater or dual thermal heaters may be incorporated into read/write head 38 to effect targeted thermal expansion of portions of head 38, such that spacing between portions of read/write head 38 and disk surface 126 can be more carefully controlled. Returning now to FIG. 2, which shows a dual heater design in which write heater 218A (Hw) is positioned near write portion 220 of head 38, and in which read heater 218B (Hr) is positioned near read portion 216 of head 38. Heaters 218A and 218B may take any suitable form. In one non-limiting example, heaters 218A and 218B may comprise heater resistors to which electrical bias signals are applied to cause a desired thermal expansion of write portion 220 and/or read portion 216 of head 38. It should be noted that, FIG. 2 is merely one non-limiting example of a read/write head configuration to which the principles of this disclosure may be applied.

There are several modes or techniques for using or powering heaters 218A and 218B. In dual independent heater (DIH) mode, only read heater 218B is used during a read operation, and only write heater 218A is used during a write operation. In other modes, a portion of the total thermal fly height control (TFC) power is applied to each heater, as determined by a dual heater power ratio (DHR). In a fixed dual heater power ratio (FDH) mode, a fixed DHR is used during read and/or write, where "DHRr" refers to the DHR used during reading and "DHRw" refers to the DHR used during writing. It should be noted that, the "DHRr" and "DHRw" may be the same or different. In conventional HDD manufacture and operation, dual heater power ratios DHRr and DHRw are set to be the same for different heads in a drive and are not changed to account for different temperatures in which the HDD is operated.

FIGS. 5A-5D are conceptual diagrams 500-a, 500-b, 500-c, and 500-d, respectively, illustrating the effect of the dual heater power ratio (DHR) on the spacing of read portion (reader) 216 and write portion (writer) 220 of read/write head 38 from disk surface 126, according to various aspects of the disclosure. DHR is defined as the power applied to the subject heater (reader or writer) divided by the total power applied to the read heater and the write heater. Other methods to define the power ratios may be used, such as read heater power/write heater power, or vice versa. For purposes of illustration, in FIGS. 5A-5D and in the following description FIGS. 5A-5D, DHR is calculated as the read heater power (numerator) over the total power applied to both heaters (denominator). The ratio can be similarly calculated if write heater power is instead used as the numerator.

Figure 5A:
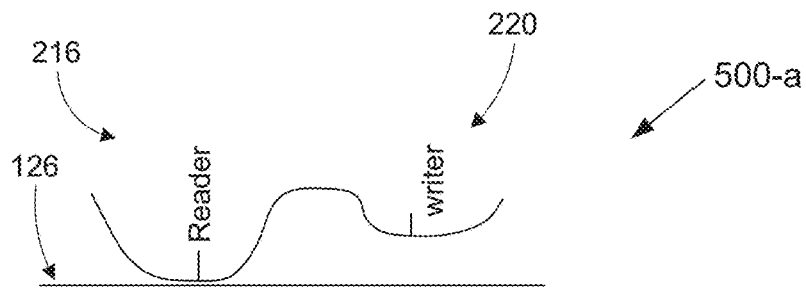
FIG. 5A is a conceptual diagram illustrating the spacing of the read and write portions of the read/write head from the disk surface at a read heater power ratio (DHR) of 100%, according to various aspects of this disclosure.
Figure 5B:
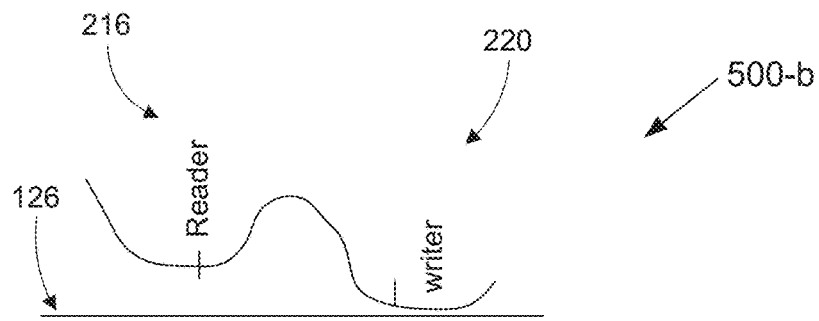
FIG. 5B is a conceptual diagram illustrating the spacing of the read and write portions of the read/write head from the disk surface at a read heater power ratio (DHR) of 0%, according to various aspects of this disclosure.
Figure 5C:
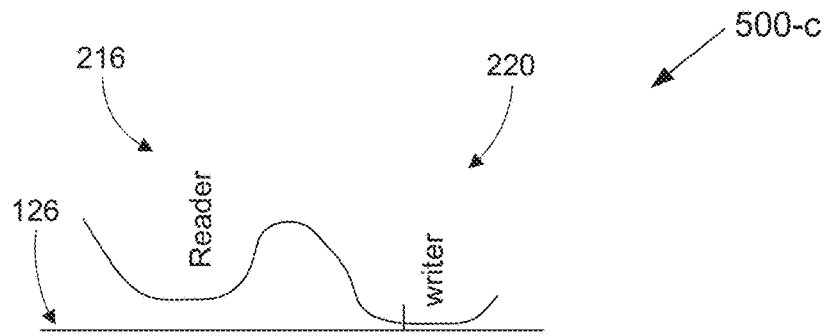
FIG. 5C is a conceptual diagram illustrating the spacing of the read and write portions of the read/write head from the disk surface at a read heater power ratio (DHR) of 10-30%, according to various aspects of this disclosure.

In the conceptual diagram 500-a shown in FIG. 5A, DHR=100%, meaning that only read heater 218B (labeled as "TFC1") is being used and that no power is supplied to write heater 218A. With DHR=100%, read portion 216 of head 38 is close to disk surface 126 and writer portion 220 of head 38 is substantially spaced from disk surface 126. In the conceptual diagram 500-b shown in FIG. 5B, DHR=0%, meaning that only write heater 218A (labeled as "TFC2") is being used. With DHR=0%, read portion 216 of head 38 is substantially spaced from disk surface 126 and write portion 220 is close to disk surface 126. In the conceptual diagram 500-c shown in FIG. 5C, DHR is in the 10~30% range, meaning that more of the TFC power is being supplied to the write heater 218A. With DHR=10~30%, write portion 220 is close to disk surface 126 and read portion 216 is slightly more spaced from disk surface 126. In the conceptual diagram 500-d shown in FIG. 5D, DHR is in the 60~90% range, meaning that more of the TFC power is being supplied to the read heater 218B. With DHR=60~90%, read portion 216 is close to disk surface 126 and write portion 220 is slightly more spaced from disk surface 126.

Figure 5D:
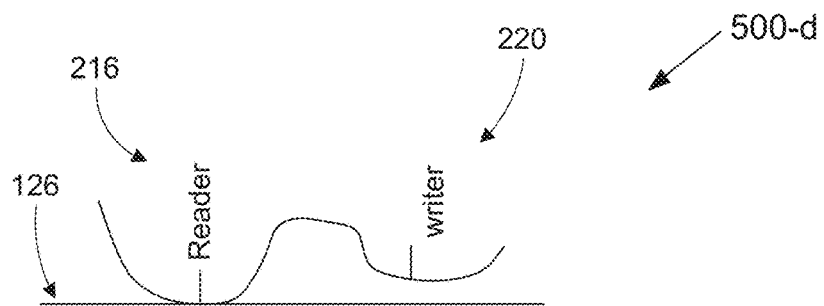
FIG. 5D is a conceptual diagram illustrating the spacing of the read and write portions of the read/write head from the disk surface at a read heater power ratio (DHR) of 60-90%, according to various aspects of this disclosure.
Figure 6:
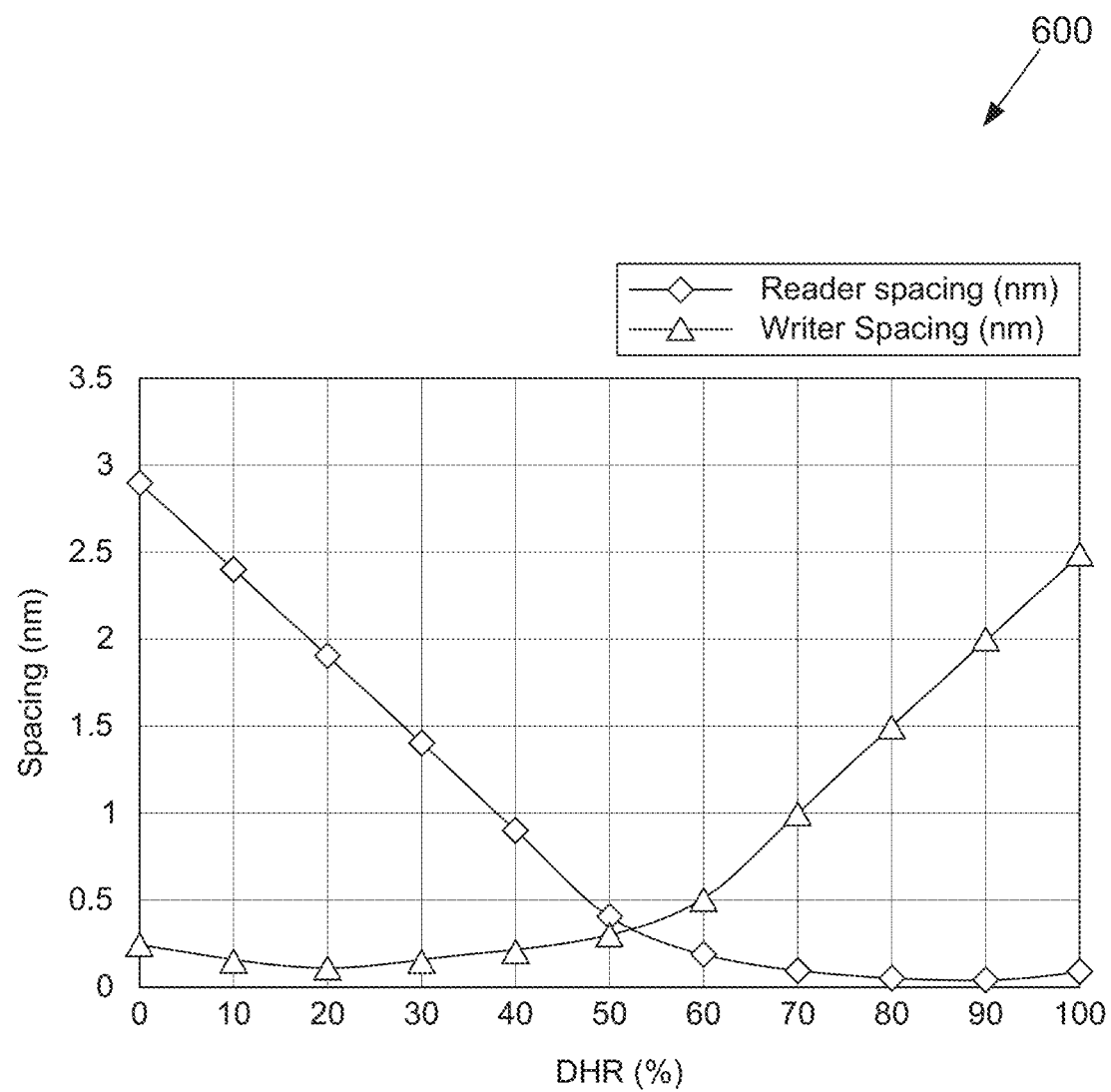
FIG. 6 is a graph showing read spacing and write spacing over a range of DHR percentages, according to various aspects of this disclosure.

FIG. 6 illustrates a graph 600 showing read spacing (nm) and write spacing (nm) (shown on vertical or y-axis) across a range of DHR percentages (shown on horizontal or x-axis), as is partly illustrated in FIGS. 5A-5D.

As mentioned above, a single heater design may also be used in some embodiments. In a single heater design, where the DFH gamma =(read spacing change)/(write spacing change), a low gamma mode and a high gamma mode are provided. In low gamma mode (gamma<=1.0), write portion 220 has minimum spacing from disk surface 126, and read portion 216 has a larger variation in spacing (i.e., "spacing variation"). In high gamma mode (gamma>1.0), read portion 216 has minimum spacing from disk surface 126, and write portion 220 has a larger spacing variation.

For dual independent heaters, several modes are provided. In DIH mode, a DHR of 100% (all power applied to read heater) is used for read operations (FIG. 5A) and a DHR of 0% (all power applied to write heater) is used for write operations (FIG. 5B), which provides minimum spacing for both read and write operations. In fixed low DHR mode, a DHR of 100% (FIG. 5A) is used for read operations and a DHR of 10~30% (FIG. 5C) is used for write operations, which provides minimum spacing for read operations and extremely small spacing for write operations. In fixed high DHR mode "A", a DHR of 60~90% (FIG. 5D) is used for both read and write operations (i.e., DHRr=DHRw). Fixed high DHR mode "A" is similar to high gamma mode in single heater design and is advantageous in that touchdown (TD) is always at reader shields. In fixed high DHR mode "B", a DHR of 100% is used for read operations (FIG. 5A) and a DHR of 60~90% (DHRr=60~90%) is used for write operations (FIG. 5D).

DIH provides the most optimal read and write spacing control. In some circumstances, however, DIH mode needs more firmware (FW) (e.g., two sets of firmware—one for read and one for write) to implement read and write spacing control and/or more manufacturing processing time relative to the other two designs. Additionally, or alternatively, the TD point consistency may also not be as good in DIH mode, as compared to the single heater and dual heater fixed high DHR mode designs.

In addition, there are strict requirements on the writer shield topography area of the write portion of read/write head 38 that cannot be easily met by a DIH design. Sensitive elements such as the write pole (WP), a microwave assisted magnetic recording (MAMR) element (if used), and/or the near field transducer (NFT) (which is used to locally heat the magnetic media in heat assisted magnetic recording (HAMR) to lower the coercive force of that local region and facilitate higher density recording) may not be sufficiently protected and may contact disk surface 126 during the manufacturing process and in-field operations, leading to reliability and lifetime issues when DIH mode is used.

Figure 7A:
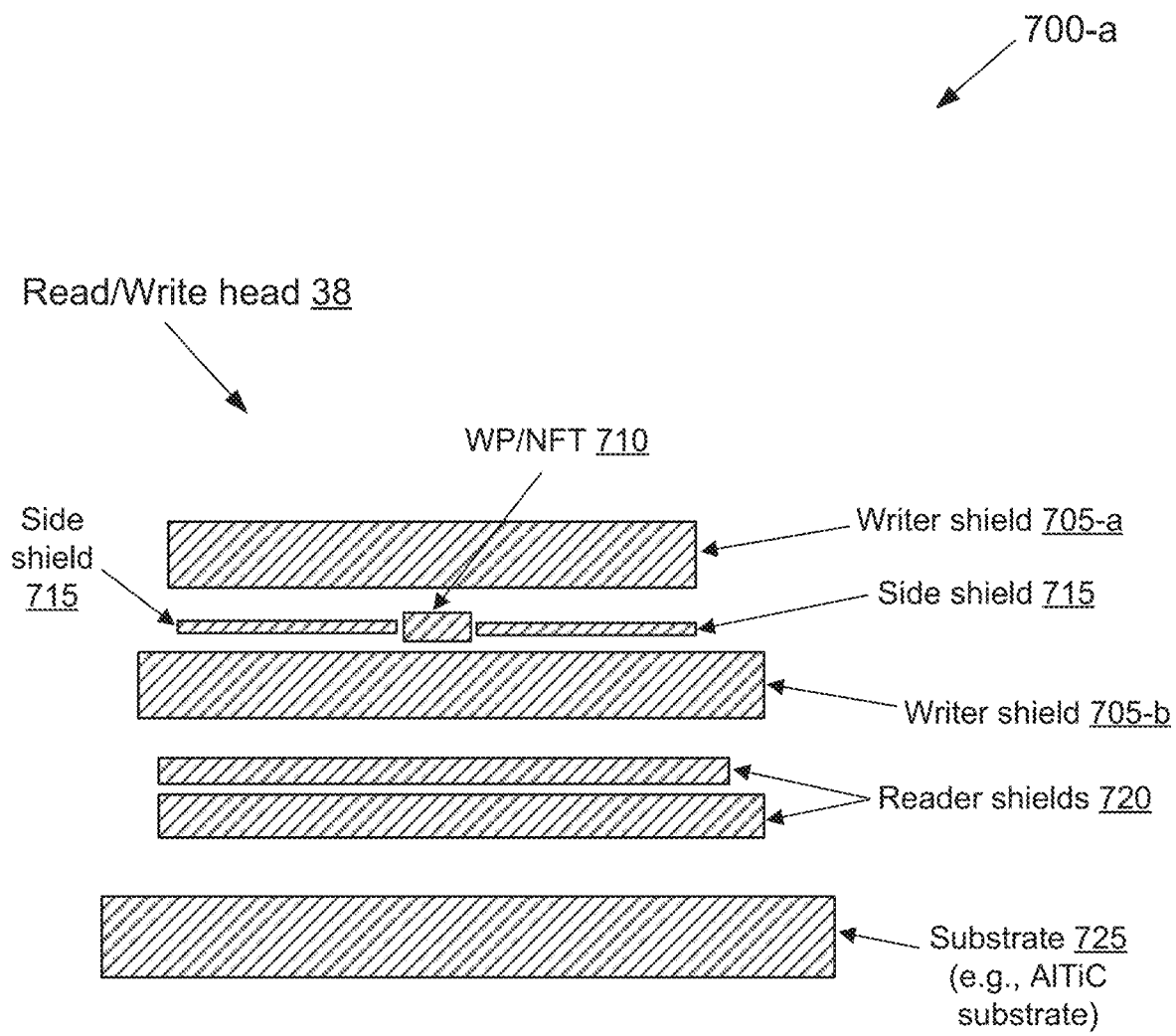
FIG. 7A is a cross-sectional view of a thin film magnetic read/write head structure integrated on a side surface of a slider, where the slider comprises a substrate, according to various aspects of this disclosure.

FIG. 7A illustrates a cross-sectional view 700-a of a thin film magnetic read/write head structure 38, according to various aspects of the disclosure. In some examples, read/write head 38 comprises a thin film layered structure integrated on a side surface of a slider (e.g., slider 120 described in relation to the preceding figures). In one non-limiting example, the slider comprises an Aluminum-Titanium-Carbon (AlTiC) substrate, although other types of substrates known and/or contemplated in the art may be utilized in different embodiments. In some cases, the read/write head 38 is constructed by depositing and etching various layers on the slider 120.

As can be seen, the read/write head 38 includes a first writer shield 705-a, a write pole 710 (in the case of HAMR, an NFT would additionally be present adjacent to the write pole), one or more side shields 715, a second writer shield 705-*b*, one or more reader shields 720, and a substrate 725 (e.g., AlTiC substrate).

Figure 7B:
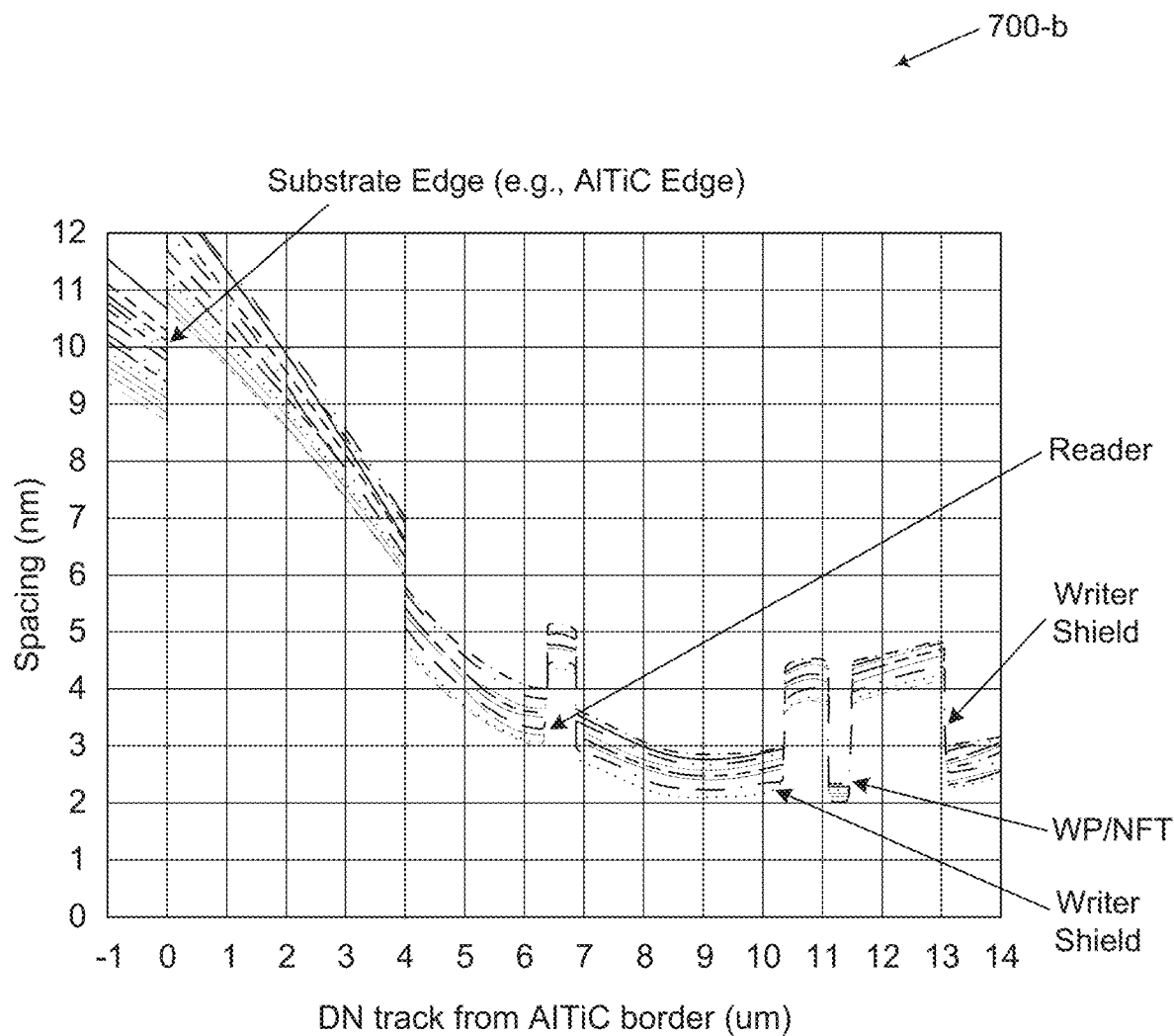
FIG. 7B is a graph illustrating spacing of the topographical elements of the write gap (WG) area of FIG. 7A from a substrate edge (e.g., Aluminum Titanium Carbon or AlTiC edge) of the slider, according to various aspects of this disclosure.

FIG. 7B illustrates a graph 700-b depicting the spacing of the topographical elements of the write gap area from the substrate edge (e.g., AlTiC edge), for instance, the edge of the substrate 725 in FIG. 7A. In some examples, the write pole (WP) and near field transducer (NFT) areas are relatively small, which raises the issue of whether they may trigger friction force-based TD detections. In addition, due to the pole tip recession (PTR), fly height (FH) and temperature variations described above, the minimum spacing point may vary in at least four locations: first writer shield 705-*a*; the area at or near the WP/NFT 710, side shield(s) 715, and second writer shield 705-*b*, raising the issue of whether drive touchdown (TD) detection code can manage this situation. Further, during write TD, the touchdown (TD) point may include the WP/NFT 710, which raises the risk of damage of those elements.

In view of these various issues associated with heater control and reader and writer spacing, an adaptive dual heater (ADH) mode is provided by which the dual power ratios of read and write heaters 218A and 218B are adaptively controlled, according to various aspects of this disclosure. In some embodiments, control of heaters 218A and 2188 and their dual power ratios may be implemented by way of control circuitry 22, an integrated circuit (IC) implemented in actuator assembly 30, or a combination thereof, or by any other applicable controller and/or processor suitable for providing appropriate control signals to heaters 218A and 218B.

Figure 8:
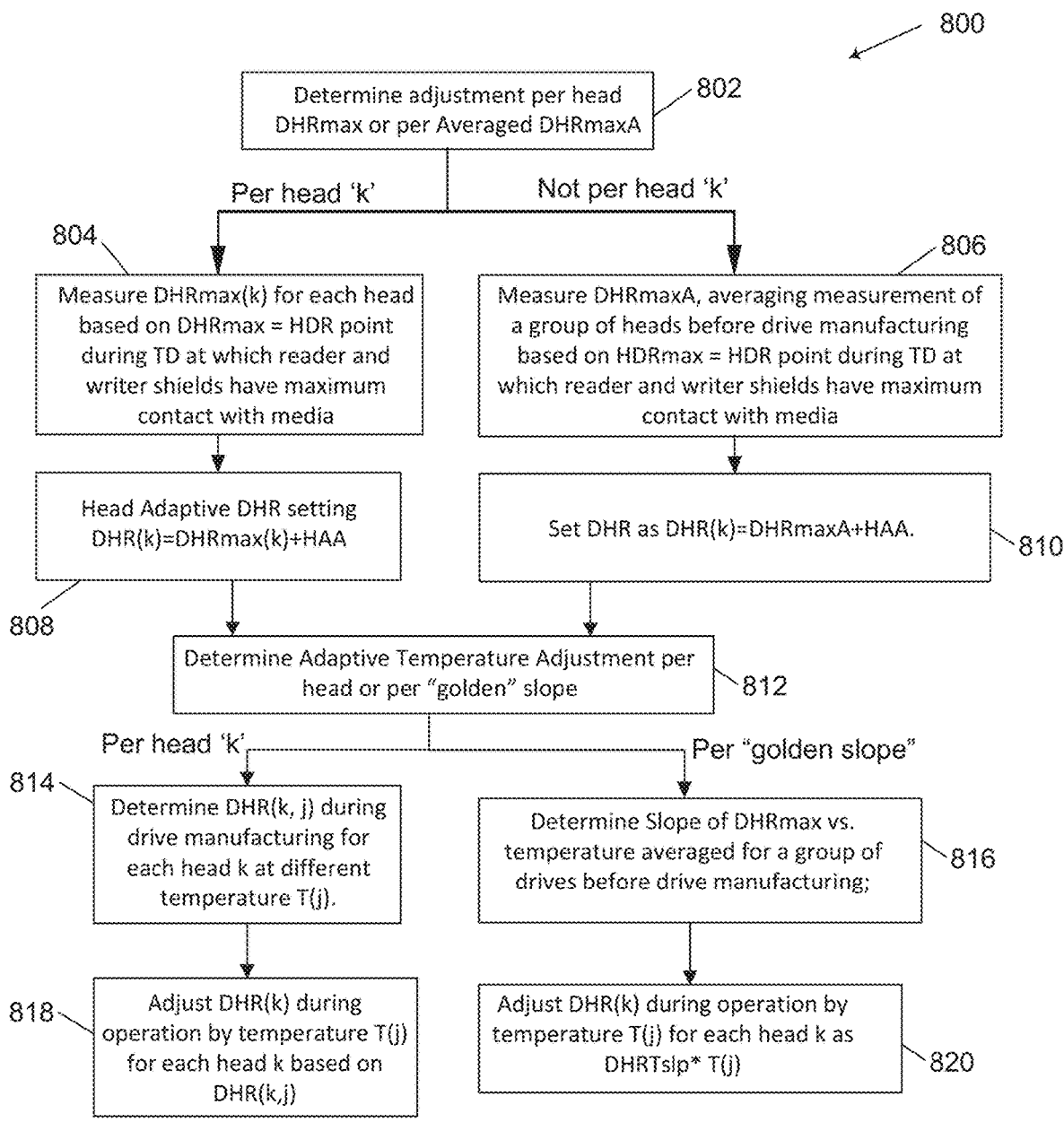
FIG. 8 is a flow diagram illustrating a method for adaptive dual heater control, according to various aspects of this disclosure.

FIG. 8 is a flow diagram illustrating a method 800 for adaptive dual heater control, according to various aspects of this disclosure. In step 802, the method comprises determining the dual heater ratio (DHR) adjustment per head, where the DHR may be a DHR at which a maximum touchdown (TD) response is detected (i.e., DHRmax, further explained below) or an averaged DHRmax (e.g., averaging the DHRmax's of multiple heads). Steps 804 and 808 follow the per-head approach, while steps 806 and 810 follow the averaging approach.

In some embodiments, at step 802, the dual heater ratio (DHR) point during touchdown (TD) at which the reader and writer shields have maximum contact with the media (disk surface 126) is determined and set as DHRmax. In some cases, determination of DHRmax is a per-head determination that is typically conducted during the HDD manufacturing process (step 804). Step 802 may additionally (or alternatively) comprise determining an averaged DHRmax, referred to as DHXmaxA, for two or more heads (step 806).

Figure 9A:
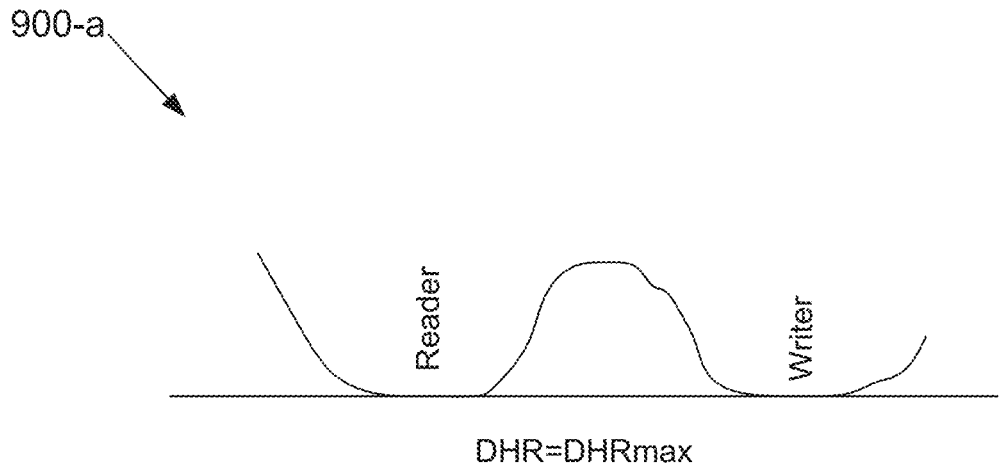
FIG. 9A is a conceptual diagram showing the DHR point (DHRmax) at which the reader and writer shields have maximum contact with the disk media, according to various aspects of this disclosure.

FIG. 9A is a conceptual diagram 900-a showing the DHR point (DHRmax) at which the reader and writer shields have maximum contact with the media, according to various aspects of this disclosure. When DHR=DHRmax, the total TD response reaches maximum, and friction-related TD responses such as sector to sector (S2S) time variation, servo position error signal (PES), embedded contactor sensor (ECS) signal, non-repeatable run-out (NRRO), etc., also reach a maximum since the largest contact area between the reader and writer shields and the disk surface occurs at DHRmax. Many factors affect DHRmax, such as, but not limited to, wafer TM design (gamma and shield structure), pole tip recession (PTR), slider fly height or FH, temperature, etc. In other words, DHRmax may be head and/or temperature dependent, in some examples. In particular, for HAMR, which requires a large energy injection generating high heat (400-500+degrees C. hot spots on media), and/or other energy assisted recording approaches that also generate heat in and around the read/write head, temperature dependency can play an increased role, along with the effect caused by variability in the temperature-based response in per-head variation.

Figure 9B:
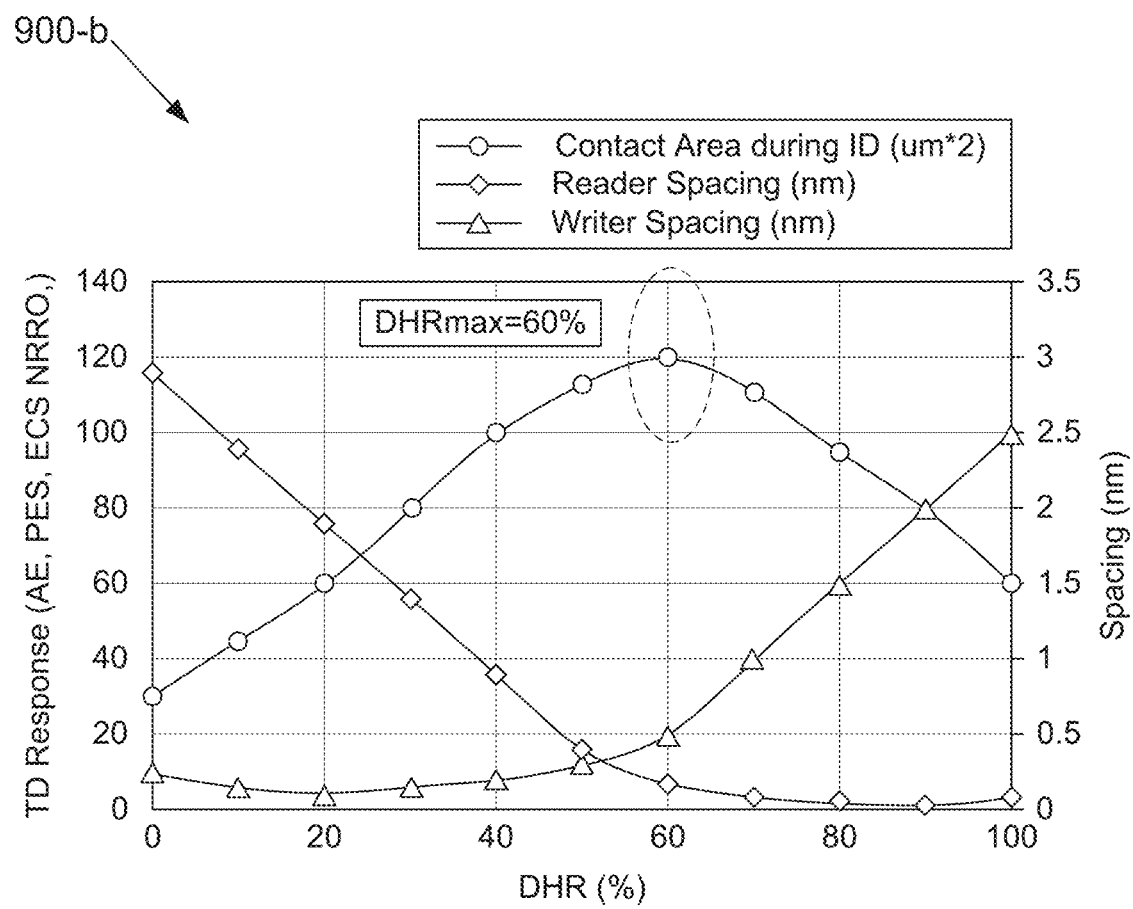
FIG. 9B is a graph illustrating contact area during touchdown (TD), and reader spacing and writer spacing relative to DHR (e.g., for setting DHRmax), according to various aspects of this disclosure.

FIG. 9B illustrates a graph 900-*b* depicting contact area during touchdown (TD), and reader spacing and writer spacing relative to DHR (e.g., for setting DHRmax), according to various aspects of this disclosure. As can be seen in FIG. 9B, DHRmax is set at the point at which friction-related TD responses (S2S, PES, ECS, NRRO, etc.) are at their maximum. In the non-limiting example of FIG. 9B, DHRmax is approximately 60%. Graph 900-*b* in FIG. 9B also shows the reader spacing and writer spacing relative to the DHRmax determination.

Returning to FIG. 8, at step 804, the method 800 comprises measuring a DHRmax(k) for each head 'k' based on determining the DHRmax, which is the dual heater ratio (DHR) point during touchdown (TD) at which the reader and writer shields have maximum contact with the media (disk surface 126). At step 808, the method 800 comprises setting, for each head 'k', a heat adaptive DHR setting given by DHR(k)=DHRmax(k)+HAA. While not necessary, the head additional adjustment or HAA is mainly used for providing some protection of the write pole (and near field transducer (NFT), if present in the case of HAMR) (e.g., shown WP/NFT 710 in FIG. 7A). This is because a higher DHR increases power to the reader heater, drawing it closer to the disk surface. Conversely, a higher DHR reduces power to the writer heater, drawing it farther from the disk surface to minimize contact that can wear or otherwise damage sensitive components such as the write pole and/or NFT. Furthermore, the HAA value may be determined based on one or more of wafer design, PTR, NFT protrusion during writing (also referred to as NFTptp), etc. For example, a larger HAA value may be utilized for a larger NFTptp. As noted above, the HAA value is typically in the range of 10~30%, although other percentage ranges (e.g., 3~25%, 10~40%, 7~35%, etc.) are contemplated in different embodiments and the example(s) listed herein are not intended to be limiting. In some examples, the HAA value (e.g., anywhere between 3 and 40%) may be fixed going forward.

At step 806, the method 800 comprises measuring the DHRmaxA, based on averaging the DHRmax measurements for a group of heads, where the DHRmax corresponds to the DHR point during touchdown (TD) at which the reader and writer shields (e.g., writer shields 705, reader shields 720 in FIG. 7A) have maximum contact with the disk media. Further, at step 810, the method 800 comprises setting the DHR for a head 'k' as DHR(k)=DHRmaxA+HAA. In some circumstances, a larger HAA value may be used to compensate for the DHRmax head-to-head variation (i.e., variation in DHRmax for different heads).

At step 812, the method comprises determining an adaptive temperature adjustment per head 'k' (steps 814 and 818) or per "golden slope" (steps 816 and 820). For example, a plurality of temperature adaptive adjustments (e.g., one per read/write head 'k') may be determined for a typical operating range of temperatures. In this manner, DHR can be automatically adjusted during operation to eliminate temperature variation effects, further described below.

Figure 10:
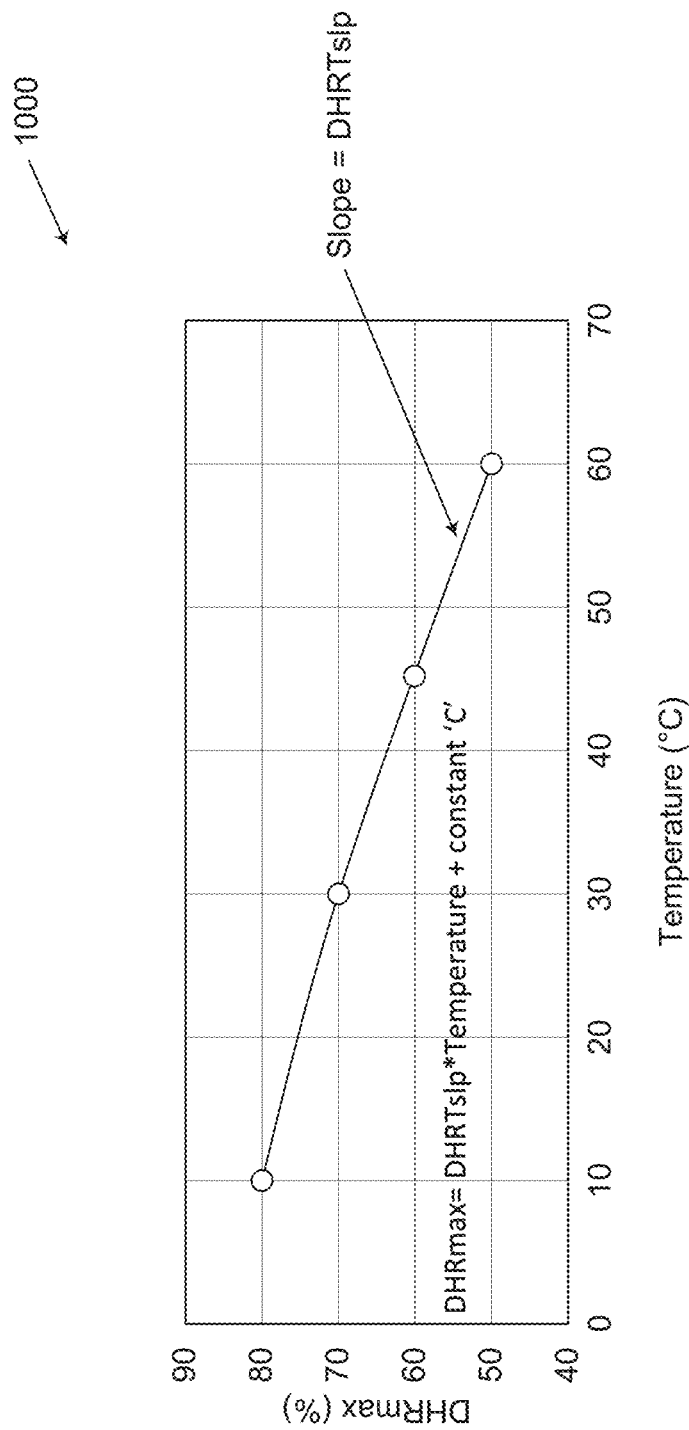
FIG. 10 is a graph illustrating DHR temperature adjustment settings based on a range of head temperatures, according to various aspects of this disclosure.

FIG. 10, for example, is a graph 1000 illustrating DHR temperature adaptive adjustments (shown as DHRmax on the vertical or y-axis) for a range of head temperatures (shown as temperature in degrees C. on the horizontal or x-axis), according to various aspects of this disclosure. In some embodiments, these adaptive temperature adjustments can be determined on a "per-head" basis during HDD manufacturing for each head, or they can be obtained on a "golden slope" basis (also referred to as "golden curve" basis) in which adjustment for a group of heads is measured before HDD manufacturing, as indicated in step 812. The golden slope/curve process generates a reference slope or curve correlating the measurements with expected output values. In the example of FIG. 10, the slope would enable a DHRmax value output based on a temperature input. Based on these measurements and the determined temperature adjustment curve, DHR is automatically adjusted during HDD operation based on the actual head temperature (step 818 and/or step 820).

At step 814, the method 800 comprises determining DHR (k,j) for different heads 'k' at different temperatures (T(j)). In some examples, DHR (k,j) may be determined during HDD manufacturing for each head 'k' at a plurality of temperatures, T(j). At step 818, the method comprises adjusting the DHR(k) determined at step 808 for a temperature, T(j), for each read/write head 'k' based on the corresponding DHR (k,j).

At step 816, the method comprises determining a slope of DHRmax vs temperature, where the slope may be based on values (e.g., averaging) from a group of drives (e.g., HDDs) before drive manufacturing. Further, at step 820, the method 800 comprises adjusting the DHR(k) determined at step 810 for a temperature, T(j), for each head 'k'. In some cases, the DHR(k) may be adjusted during operation of the disk drive, where the adjustment may be given by DHRTslp*T(j). In some embodiments, DHRTslp is the slope of the DHRmax against temperature. Specifically, DHRmax=DHRTslp*temperature+a constant baseline temperature (given in C).

In the adaptive dual heater (ADH) control mode described above, DHR can be (1) set to be the same for both read and write operations to reduce firmware (FW) development and manufacturing cost and time, or (2) can be set differently for read and write operations to optimize spacing control. In other words, a different DHRmax can be determined for the read head and the write head based on measured properties of the heads during the manufacturing process, and different DHRr and DHRw can be set based on those separate measurements.

The ADH mode of this disclosure is adaptive per head and/or per temperature and is therefore able to facilitate less spacing variations (i.e., less variations in spacing). Additionally, or alternatively, since there are fewer topography requirements around the write area, the disclosed ADH mode helps enhance reliability (as compared to the prior art) since the optimized spacing control is better able to protect sensitive elements such as the write pole (WP), microwave assisted magnetic recording (MAMR) elements (if used), and/or the near field transducer (NFT) (in the case of HAMR) from directly contacting the media.

ADH control, in accordance with various embodiments, with the same DHR for both read and write serves to provide good read and write spacing, reduces firmware (FW) and process time, has low requirements for writer shield topography and protects WP, NFT and MAMR elements, and has good TD point consistency. Furthermore, ADH control with the same DHR for both read and write provides many of the same advantages of fixed high DHR "A" mode in terms of reduced FW and process time, TD point consistency, low requirements for writer shield topography and protection of sensitive elements, but also represents a substantial improvement over the large write space variation that is present in fixed high DHR "A" mode. ADH with a different DHR for read and write can provide the optimal read and write spacing, but may involve a tradeoff in increased FW and process time. With the embodiments described above it is noted that both DHRmax and HAA may also have the same unit of measurement (e.g., %).

Any suitable control circuitry may be employed to implement the methods (e.g., method flow 180, method 800) described herein, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC). The control circuitry may also include a preamp circuit implemented as a separate integrated circuit, integrated into the read channel or data storage controller circuit, or integrated into an SoC.

The control circuitry (e.g., control circuitry 22 in FIG. 1A) may comprise a microprocessor executing instructions operable to cause the microprocessor to perform the methods described herein. The instructions may be stored in any computer-readable medium. The instructions may be stored on a non-volatile semiconductor memory device, component, or system external to the microprocessor, or integrated with the microprocessor in an SoC. The instructions may be stored on a disk and read into a volatile semiconductor memory when the disk drive is powered on. The control circuitry may comprise suitable logic circuitry, such as state machine circuitry. The methods, such as, but not limited to, method 800, described herein may be implemented using analog circuitry (e.g., analog comparators, timers, etc.), digital circuitry and/or a combination of analog and digital circuitry.

One or more processing devices may comprise the control circuitry 22 described herein and may perform one or more of the functions of the control circuitry 22 described herein. The control circuitry 22 may be abstracted away from being physically proximate to the disks and disk surfaces. The control circuitry 22 may be part of (or proximate to) a rack of or a unitary product comprising multiple data storage devices or may be part of (or proximate to) one or more physical or virtual servers or may be part of (or proximate to) to one or more local area or storage area networks or may be part of (or proximate to) a data center or may be hosted in one or more cloud services.

A disk drive as described herein may include a magnetic disk drive, an optical disk drive, a hybrid disk drive, or other types of disk drive. In addition, electronic devices such as computing devices, data server devices, media content storage devices, or other devices, components, or systems may comprise the storage media and/or control circuitry described herein.

The features and methods described herein may be used independently of one another or may be combined in various ways. All possible combinations and sub-combinations are intended to fall within the scope of this disclosure. Certain method, event, or process blocks may be omitted in some implementations. The methods described herein are not limited to any particular sequence, and the blocks or states relating thereto can be performed in other sequences. The systems and components described herein may be configured differently than described. Elements may be added to, removed from, or rearranged relative to this disclosure.

While this disclosure has been described with reference to various examples and particular implementations, these examples are illustrative, and the scope of this disclosure is not limited to them. Many variations, modifications, and additions are possible and are within the scope of this disclosure. Such variations, modifications and additions fall within the scope of the disclosure as defined in the claims that follow.

What is claimed is:

1. A data storage device comprising:
   a disk;
   a plurality of read/write heads, each read/write head having a read portion configured to read data from the disk and a write portion configured to write data to the disk, each read/write head comprising:
      a read heater disposed proximate to the read portion and configured to thermally adjust a read spacing of the read portion from a surface of the disk;
      a write heater disposed proximate to the write portion and configured to thermally adjust a write spacing of the write portion from the surface of the disk; and
   a controller configured to:
      for each read/write head, control power applied to the read heater and power applied to the write heater based on a dual heater power ratio (DHR) of the respective power applied to each of the read heater and the write heater,
      wherein the DHR is set based on a point during touchdown at which a reader shield and a writer shield have maximum contact with the surface of the disk (DHRmax), and wherein DHRmax is determined on a per-head basis.

2. The data storage device of claim 1, wherein the DHR for each read/write head of the data storage device is based at least in part on a corresponding DHRmax and a head additional adjustment (HAA).

3. The data storage device of claim 2, wherein the DHR for each read/write head is DHR=DHRmax+HAA.

4. The data storage device of claim 2, wherein
   the controller is further configured to use the same HAA for all read/write heads in a full temperature range, and
   the controller is further configured to determine the HAA based on one or more of wafer design, a pole tip recession (PTR) mean value, a near-field transducer protrusion mean value, and a reliability required margin.

5. The data storage device of claim 2, wherein the HAA is between 10~30%.

6. The data storage device of claim 2, wherein the controller is further configured to determine a temperature adaptive adjustment on a per-head basis that is used to adjust the DHR based on a temperature of a respective read/write head during operation of the data storage device.

7. The data storage device of claim 6, wherein a range of temperature adaptive adjustments are determined on a per-head basis during manufacture of the data storage device.

8. The data storage device of claim 6, wherein a range of temperature adaptive adjustments are determined for a group of read/write heads of the plurality of read/write heads before manufacture of the data storage device.

9. A data storage device comprising:
   a disk;
   a plurality of read/write heads configured to read data from the disk and to write data to the disk;
   a plurality of heaters disposed in each of the plurality of read/write heads and configured to thermally adjust a spacing of the corresponding read/write head from a surface of the disk; and
   a controller configured to, for each of the plurality of read/write heads, control an amount of power applied to the plurality of heaters based on a point during touchdown at which a reader shield and a writer shield of the corresponding read/write head have maximum contact with the surface of the disk (DHRmax), and wherein the controller is further configured to determine a plurality of DHRmax points on a per-head basis.

10. The data storage device of claim 9, wherein controlling the amount of power applied to the plurality of heaters in each of the plurality of read/write heads is based on a dual heater power ratio (DHR) of the respective power applied to each of the plurality of heaters of a corresponding read/write head, and wherein the DHR for each read/write head of the data storage device is based at least in part on a corresponding DHRmax and a head additional adjustment (HAA), and wherein,
   the controller is further configured to use the same HAA for all read/write heads in a full temperature range, and
   the controller is further configured to determine the HAA based on one or more of wafer design, a pole tip recession (PTR) mean value, a near-field transducer protrusion mean value, and a reliability required margin.

11. The data storage device of claim 9, wherein the controller is further configured to determine a temperature adaptive adjustment that is used to adjust an amount of power applied to the plurality of heaters based on a temperature of the corresponding read/write head during operation of the data storage device.

12. The data storage device of claim 11, wherein a range of temperature adaptive adjustments are determined on a per-head basis during manufacture of the data storage device.

13. The data storage device of claim 11, wherein a range of temperature adaptive adjustments are determined for the plurality of read/write heads before manufacture of the data storage device.

14. A method for determining a dual heater power ratio (DHR) for controlling power applied to a read heater and a write heater of a read/write head of a data storage device, comprising:
   setting the DHR based on:
      a point during touchdown at which a reader shield and a writer shield have maximum contact with a surface of the disk (DHRmax); and
      a head additional adjustment (HAA); and
   setting the DHR for each read/write head of the data storage device, including at least the read/write head, to be DHRmax+HAA.

15. The method of claim 14, wherein the DHR is adjusted during operation of the data storage device based on an operating temperature of the read/write head.

16. The method of claim 14, wherein
   DHRmax is determined during a manufacturing process of the data storage device on a per-head basis; and
   the HAA is determined during the manufacturing process of the data storage device, and is based on wafer design, a pole tip recession (PTR) mean value, a near-field transducer protrusion mean value, and a reliability requirement margin.

17. The method of claim 14, further comprising:
determining a range of temperature adaptive adjustments during a manufacturing process of the data storage device on a per-head basis.

18. The method of claim 14, further comprising:
determining a range of temperature adaptive adjustments for a group of read/write heads before a manufacturing process of the data storage device, wherein the group of read/write heads includes the read/write head.

19. A data storage device, comprising:
a disk;
one or more read/write heads configured to read data from the disk and to write data to the disk;
a plurality of heaters disposed in each of the one or more read/write heads and configured to thermally adjust a spacing of the corresponding read/write head from a surface of the disk; and
a controller configured to:
control an amount of power applied to the plurality of heaters based on a point during touchdown at which a reader shield and a writer shield of a corresponding read/write head have maximum contact with the surface of the disk (DHRmax); and
determine a temperature adaptive adjustment that is used to adjust the amount of power applied to the plurality of heaters based on a temperature of the corresponding read/write head during operation of the data storage device.

\* \* \* \* \*